(12) United States Patent
Maekawa

(10) Patent No.: US 10,401,829 B2
(45) Date of Patent: Sep. 3, 2019

(54) MACHINE LEARNING DEVICE FOR MACHINE TOOL AND THERMAL DISPLACEMENT COMPENSATION DEVICE

(71) Applicant: FANUC CORPORATION, Yamanashi (JP)

(72) Inventor: Susumu Maekawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 23 days.

(21) Appl. No.: 15/860,028

(22) Filed: Jan. 2, 2018

(65) Prior Publication Data

US 2018/0196405 A1      Jul. 12, 2018

(30) Foreign Application Priority Data

Jan. 10, 2017    (JP) .................................. 2017-001951

(51) Int. Cl.
*G06F 19/00*     (2018.01)
*G05B 19/404*    (2006.01)
(Continued)

(52) U.S. Cl.
CPC ....... *G05B 19/404* (2013.01); *G05B 19/4155* (2013.01); *G06N 20/00* (2019.01);
(Continued)

(58) Field of Classification Search
CPC .............. G05B 19/404; G05B 19/4155; G05B 2219/49205; G05B 2219/49211; G06N 20/00; B23Q 15/18
See application file for complete search history.

(56) References Cited

U.S. PATENT DOCUMENTS 6,456,896 B1 *  9/2002  Ito .................... G05B 19/404
                                              700/174
6,471,451 B2   10/2002  Kojima et al.
(Continued)

FOREIGN PATENT DOCUMENTS

JP          6-8107         1/1994
JP          7-75937        3/1995
(Continued)

OTHER PUBLICATIONS

Notification of Reasons for Refusal dated Sep. 4, 2018 in Japanese Application No. 2017-001951.

*Primary Examiner* — Michael D Masinick
(74) *Attorney, Agent, or Firm* — Wenderoth, Lind & Ponack, L.L.P.

(57)    ABSTRACT

A machine learning device that can optimize an equation for estimating a thermal displacement amount of a machine element based on the operating state of the machine element. The device acquires operating state data of the machine element, acquires a measured value for the thermal displacement amount, stores the operating state data and measured values for the thermal displacement amount of the machine element as training data associated together as a label, sets an equation for calculation the thermal displacement amount based on the operating state data, calculates an estimated value for the thermal displacement amount by substituting the operating state data into this equation, determines whether a difference between the estimated value for the thermal displacement amount and the measured value for the thermal displacement amount is no more than a predetermined threshold.

7 Claims, 7 Drawing Sheets

(51) Int. Cl.
  *G05B 19/4155* (2006.01)
  *G06N 20/00* (2019.01)
  *B23Q 15/18* (2006.01)

(52) U.S. Cl.
  CPC .... *B23Q 15/18* (2013.01); *G05B 2219/49205* (2013.01); *G05B 2219/49211* (2013.01)

(56) References Cited

U.S. PATENT DOCUMENTS

| | | | | |
|---|---|---|---|---|
| 9,811,073 | B2* | 11/2017 | Nishimura | G05B 19/404 |
| 9,869,992 | B2* | 1/2018 | Takeno | G05B 19/404 |
| 9,983,564 | B2* | 5/2018 | Murahashi | B23Q 11/0007 |
| 10,025,290 | B2* | 7/2018 | Takeno | G05B 19/404 |
| 10,095,215 | B2* | 10/2018 | Qi | G05B 19/404 |
| 10,234,843 | B2* | 3/2019 | Endou | G05B 19/404 |
| 2002/0004688 | A1* | 1/2002 | Kojima | G05B 19/404 700/193 |
| 2010/0152881 | A1 | 6/2010 | Ou et al. | |
| 2012/0123586 | A1* | 5/2012 | Maekawa | G05B 19/404 700/173 |
| 2013/0190921 | A1* | 7/2013 | Maekawa | B23Q 11/0007 700/177 |
| 2014/0074299 | A1* | 3/2014 | Endou | G05B 13/02 700/275 |
| 2015/0276633 | A1* | 10/2015 | Koyama | G01M 99/002 702/94 |
| 2015/0286208 | A1* | 10/2015 | Endou | G05B 19/404 700/175 |
| 2017/0091667 | A1* | 3/2017 | Yukawa | G06N 20/00 |
| 2018/0181103 | A1* | 6/2018 | Mizoguchi | B23Q 11/0007 |

FOREIGN PATENT DOCUMENTS

| | | |
|---|---|---|
| JP | 11-114776 | 4/1999 |
| JP | 2001-138175 | 5/2001 |
| JP | 2002-18677 | 1/2002 |
| JP | 2002-224935 | 8/2002 |
| JP | 3405965 | 3/2003 |
| JP | 2003-94291 | 4/2003 |
| JP | 5956497 | 6/2016 |

* cited by examiner

MACHINE LEARNING DEVICE FOR MACHINE TOOL AND THERMAL DISPLACEMENT COMPENSATION DEVICE

This application is based on and claims the benefit of priority from Japanese Patent Application No. 2017-001951, filed on 10 Jan. 2017, the content of which is incorporated herein by reference.

BACKGROUND OF THE INVENTION

Field of the Invention

The present invention relates to a machine learning device and thermal displacement compensation device applied to a machine tool of a machining center, etc.

Related Art

Conventionally, as technology has been proposed for compensating for thermal displacement due to heat generation of a machine tool, technology that compensates simply and at a low cost without using a displacement sensor or temperature sensor (for example, refer to Patent Documents 1 and 2).

Due to not using sensors, this technology has the advantage in not requiring to consider the position and structure for installing sensors, means for protecting the sensors from chips and cutting fluid, and problems such as securing reliability in the case of a sensor failing.
Patent Document 1: Japanese Patent No. 3405965
Patent Document 2: Japanese Patent No. 5956497

SUMMARY OF THE INVENTION

In order to accurately compensate for thermal displacement in various types of machining, it is necessary to acquire vast amounts of data by repeating experiments at various conditions to establish an equation for calculating the thermal displacement amount, and establish an equation with this data. In addition to the vast amount of time required in this, it is not necessarily possible to accurately compensate with respect to any type of machining.

With the technologies described in Patent Documents 1 and 2, equations are determined based on data measured at certain operating states (machining conditions, surrounding temperature, etc.). For this reason, in an operating state differing from this operating state, it is not necessarily possible to calculate a precise thermal displacement amount. It should be noted that, although the matter of modifying the heating coefficient in the equation using a compensation error is disclosed, since coefficients (heat loss coefficient and heat conduction coefficient calculating the heat conduction from the adjacent section) are included in the equation, it may be insufficient to simply modify the heating coefficient in order to further raise the compensation precision.

Taking into account of such a situation, the present invention has an object of providing a machine learning device that optimizes an equation for estimating the thermal displacement amount of a machine element based on the operating state of the machine element during machining or during machine operation by repeating machine learning, in order to configure so as to be able to accurately compensate for thermal displacement relative to various types of machining, and a thermal displacement compensation device capable of suitably performing thermal displacement compensation of the machine position of each machine element using the equation optimized by this machine learning.

A machine learning device (e.g., the machine learning device 200 described later) according to a first aspect of the present invention is a machine learning device that optimizes an equation for estimating a thermal displacement amount of a machine element (e.g., the bed 2, column 3, feed shaft 4, work table 5, spindle head 6, spindle unit 7 described later) that thermally expands by way of machine learning, based on operating state data representing an operating state of the machine element of a machine tool (e.g., the machining center 150 described later) having the machine element, the machine learning device comprising: a data acquisition means (e.g., the data acquisition unit 202 described later) for acquiring the operating state data of the machine element; a thermal displacement amount acquisition means (e.g., the thermal displacement amount acquisition unit 203 described later) for acquiring measured values for a thermal displacement amount of the machine element; a storage means (e.g., the storage unit 204 described later) for storing the operating state data of the machine element acquired by the data acquisition means and measured values for the thermal displacement amount of the machine element acquired by the thermal displacement amount acquisition means as training data associated with each other as a label; an equation setting means (e.g., the equation setting unit 205 described later) for setting an equation for calculating the thermal displacement amount of the machine element, by performing machine learning based on the operating state data of the machine element and the measured values for the thermal displacement amount of the machine element; a thermal displacement amount calculation means (e.g., the thermal displacement amount calculation unit 206 described later) for calculating an estimated value for the thermal displacement amount of the machine element, by substituting operating state data of the machine element within a predetermined time period stored as training data in the storage means, into the equation set by the equation setting means; and a determination means (e.g., the determination unit 207 described later) for determining whether a difference between the estimated value for the thermal displacement amount of the machine element within the predetermined time period calculated by the thermal displacement amount calculation means and the measured value for the thermal displacement amount of the machine element within the predetermined time period stored as training data in the storage means is no more than a predetermined threshold, in which the equation setting means sets again the equation in a case of being determined that the difference is not no more than a predetermined threshold by way of the determination means, and sets said equation as an optimal equation in a case of being determined that the difference is no more than a predetermined threshold by way of the determination means.

According to a second aspect of the present invention, in the machine learning device as described in the first aspect, the machine element may include a feed shaft (e.g., the feed shaft 4 described later) and spindle unit (e.g., the spindle unit 7 described later) of the machine tool, and the operating state of the machine element may include at least one of a position, speed and temperature of the feed shaft, and at least one of a speed, load and temperature of the spindle unit, during operation of the machine tool.

According to a third aspect of the present invention, in the machine learning device as described in the first or second aspect, the equation setting means may set a coefficient in a predetermined equation established in advance.

According to a fourth aspect of the present invention, in the machine learning device as described in any one of the first to third aspects, the data acquisition means may acquire operating state data every predetermined sampling time of the machine element from a control device (e.g., the numerical control device 100 described later) that controls the machine tool.

According to a fifth aspect of the present invention, in the machine learning device as described in any one of the first to fourth aspects, the thermal displacement amount acquisition means may acquire a measured value for the thermal displacement amount of the machine element measured every predetermined time interval in a vicinity of a machining position of the machine tool.

A thermal displacement compensation device (for example, the thermal displacement compensation device 300 described later) for a machine tool according to a sixth aspect of the present invention includes: a compensation amount calculation means (e.g., the compensation amount calculation unit 301 described later) for calculating a compensation amount corresponding to the thermal displacement amount of the machine element calculated from the operating state data of the machine element, based on an equation optimized by way of the machine learning device as described in any one of the first to fifth aspects; and a compensation execution means (e.g., the compensation execution unit 302 described later) for compensating the machine position of the machine element, based on a compensation amount of the machine element calculated by the compensation amount calculation means.

According to a seventh aspect of the present invention, the thermal displacement compensation device as described in the sixth aspect may be included in a control device of the machine tool.

According to the present invention, it is possible to optimize an equation for estimating the thermal displacement amount of a machine tool, by repeating machine learning (supervised learning) using training data in which operating state data of the machine element and measured values for thermal displacement amount of the machine element in the machine tool are associated. As a result thereof, it becomes possible to precisely compensate for thermal displacement in various types of machining.

DETAILED DESCRIPTION OF THE INVENTION

Hereinafter, an embodiment of the present invention will be explained based on the drawings.

First Embodiment

Figure 1:
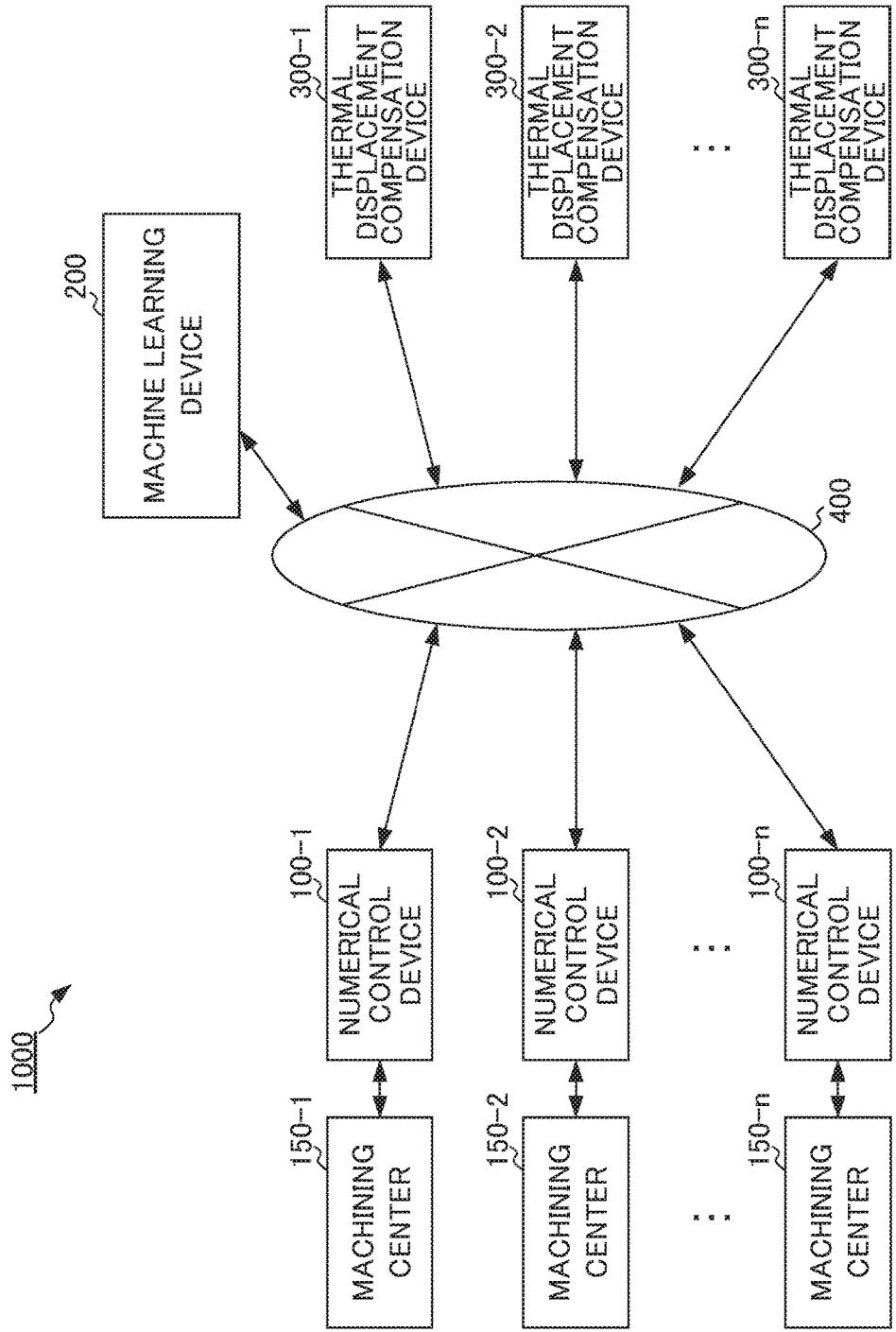
FIG. 1 is a block diagram showing a thermal displacement compensation system according to a first embodiment of the present invention.
Figure 2:
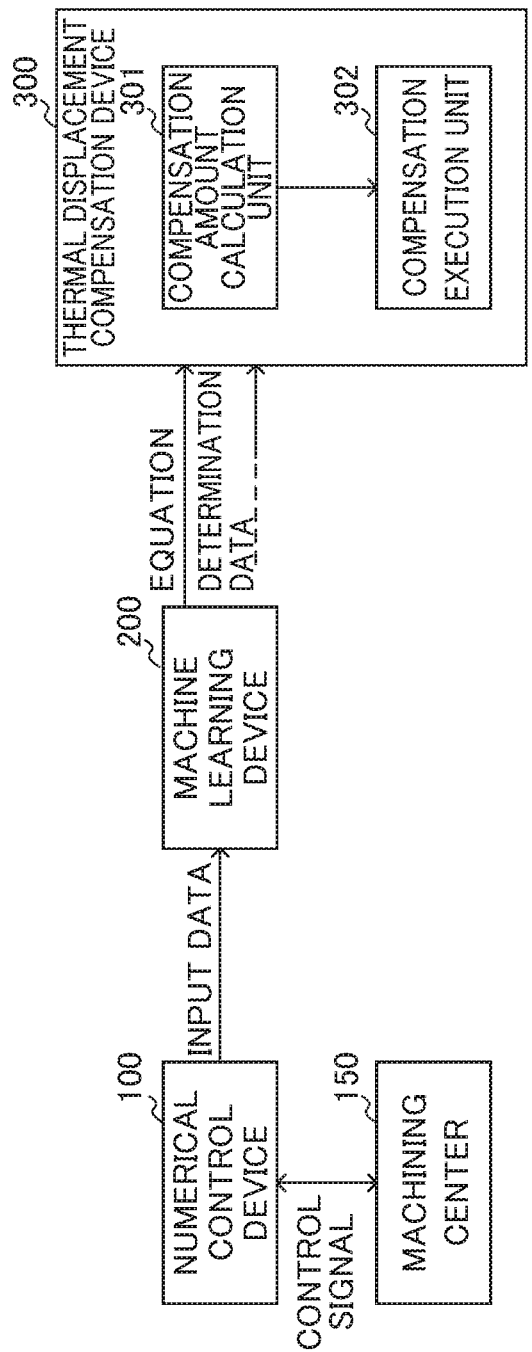
FIG. 2 is a block diagram showing the details of a thermal displacement compensation device according to the first embodiment of the present invention.
Figure 3A:
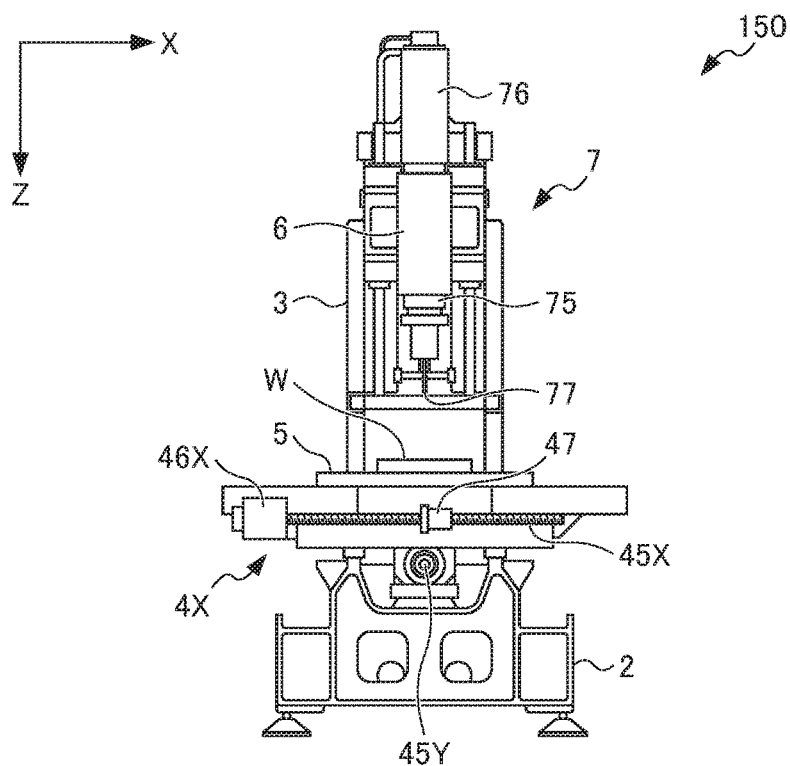
FIG. 3A is a front view of a machining center according to the first embodiment of the present invention.
Figure 3B:
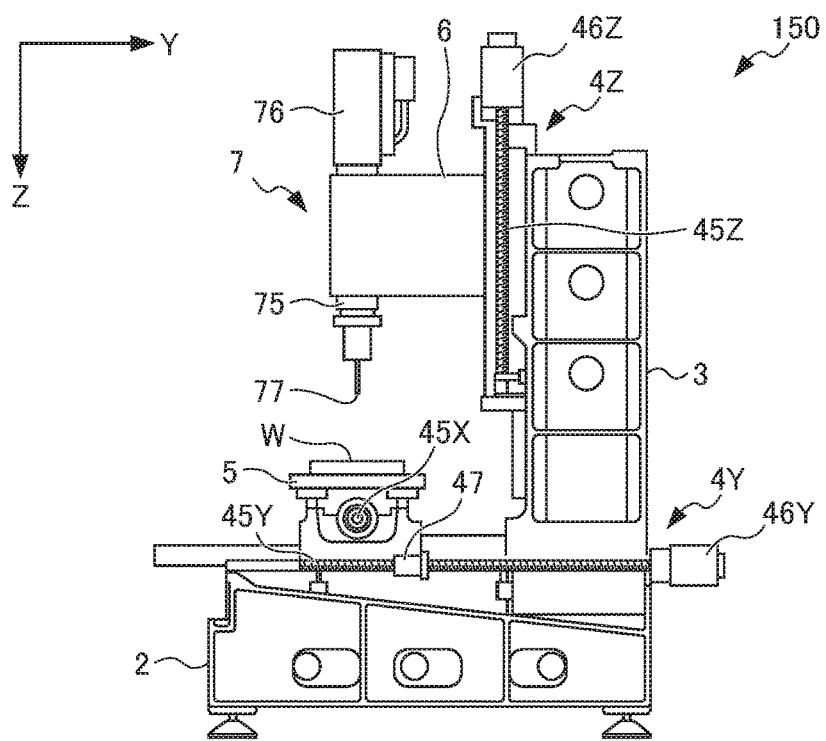
FIG. 3B is a right-side view of a machining center according to the first embodiment of the present invention.
Figure 4:
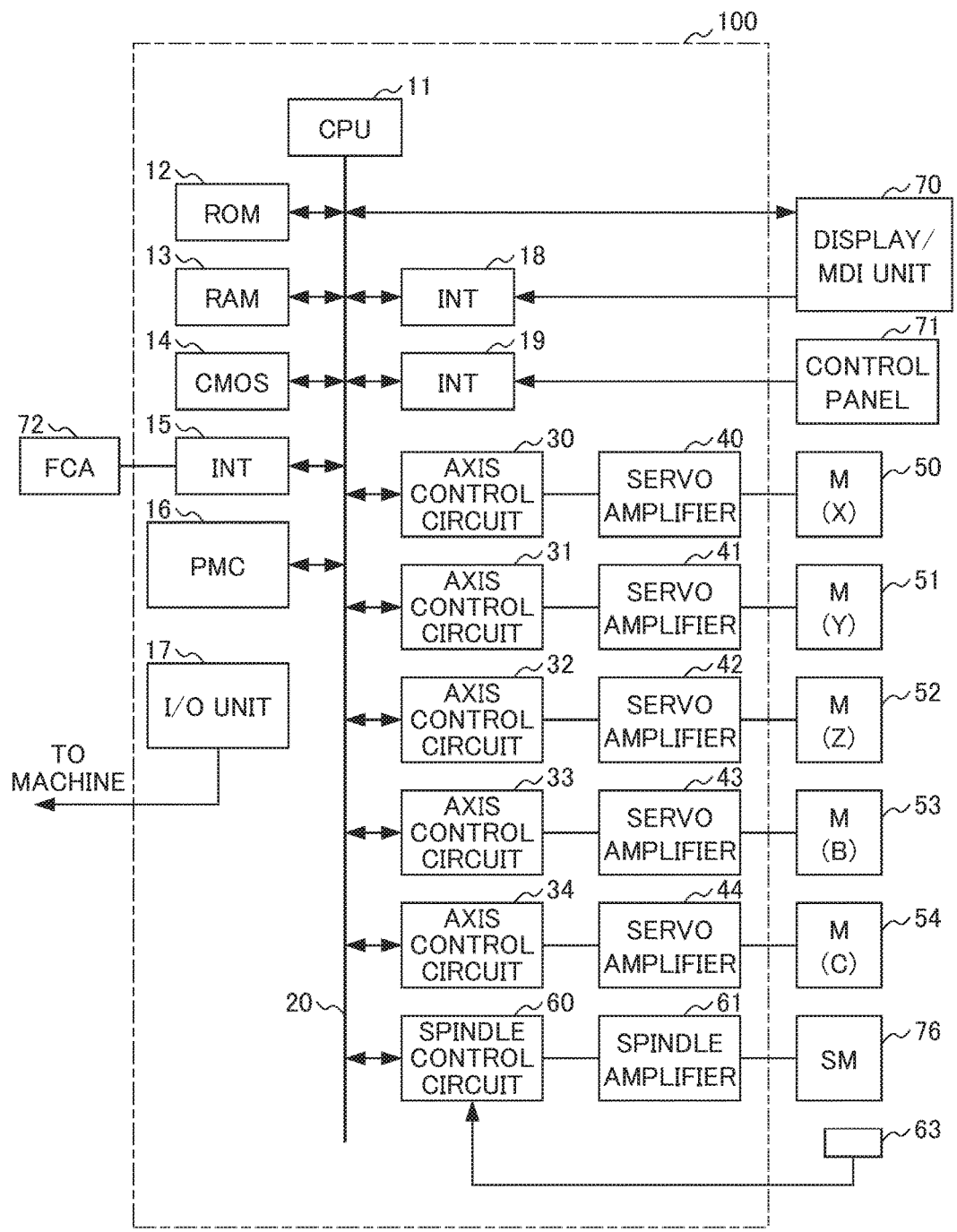
FIG. 4 is a block diagram showing principal parts of a numerical control device of the machining center according to the first embodiment of the present invention.
Figure 5:
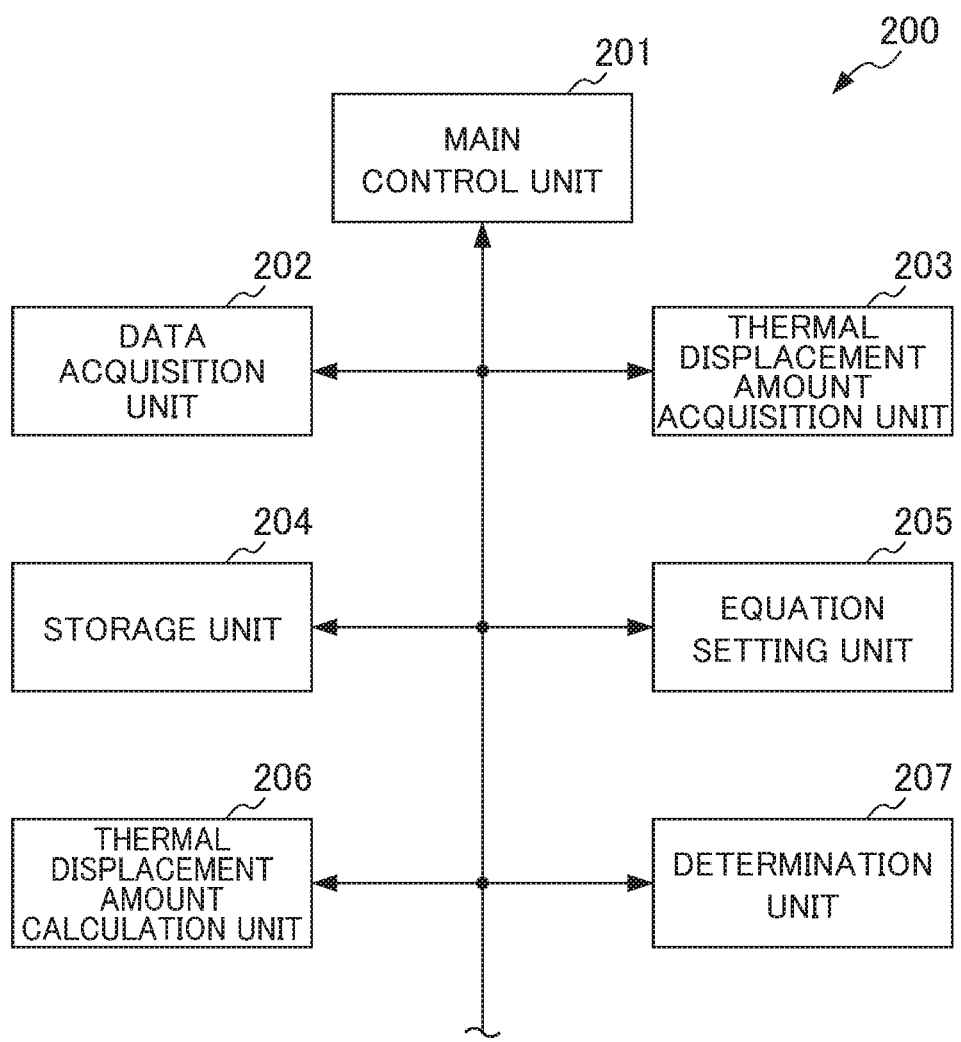
FIG. 5 is a block diagram showing a control system of a machine learning device of the machining center according to the first embodiment of the present invention.

FIG. 1 is a block diagram showing a thermal displacement compensation system according to a first embodiment. FIG. 2 is a block diagram showing the details of a thermal displacement compensation device according to the first embodiment. FIGS. 3A and 3B provide a front view and right-side view of a machining center according to the first embodiment, respectively. FIG. 4 is a block diagram showing principal parts of a numerical control device of the machining center according to the first embodiment. FIG. 5 is a block diagram showing a control system of a machine learning device of the machining center according to the first embodiment.

Hereinafter, after explaining the overall configuration of a thermal displacement compensation system 1000, each device constituting this thermal displacement compensation system 1000 (machining center 150, numerical control device 100, machine learning device 200, thermal displacement compensation device 300) will be explained in order.

<Configuration of Thermal Displacement Compensation System 1000>

First, the configuration of the thermal displacement compensation system 1000 according to the present embodiment will be explained. The thermal displacement compensation system 1000 includes n-number of numerical control devices 100, n-number of machining centers 150 as machine tools, a machine learning device 200, n-number of thermal displacement compensation devices 300 and a network 400, as shown in FIG. 1. It should be noted that n is an arbitrary natural number.

Herein, the numerical control devices 100 and machining centers 150 are established in one-to-one groups, and connected to be communicable. A plurality of these groups of the numerical control device 100 and machining center 150 may be installed in the same factory, or may be installed in respectively different factories.

In addition, the machining center 150, machine learning device 200 and thermal displacement compensation device 300 are each connected to the network 400, and are capable of mutually performing communication via the network 400. The network 400, for example, is a LAN constructed within a factory, Internet, public telephone network, or a combination of these. The specific communication system of the network 400, whether being a wired connection or wireless connection, etc., is not particularly limited. It should be noted that the thermal displacement compensation device 300 is not only connected to the numerical control device 100 via the network 400, but may be directly connected to the numerical control device 100 (i.e. without going through the network 400). In this case, the thermal displacement compensation device 300 may be included in the numerical control device 100.

Next, the functions of these devices included in the thermal displacement compensation system 1000 will be explained based on FIG. 2. Herein, FIG. 2 is a block diagram representing functional blocks included in each device. It should be noted that, since the respective numerical control devices 100 have equivalent functions, only one is illustrated in FIG. 2. Similarly, since each of the machining centers 15 and thermal displacement compensation devices 300 also have equivalent functions, respectively, only one thereof is illustrated in FIG. 2. In addition, the network 400 existing between each device is omitted from illustration.

<Configuration of Machining Center 150>

The machining center 150 is configured from a plurality of machine elements such as a bed 2, column 3, feed shaft 4, work table 5, spindle head 6, spindle unit 7, etc., as shown in FIGS. 3A and 3B. It should be noted that there are three types of the feed shafts 4 of a feed shaft 4X in the X-axis direction (left/right direction in FIG. 3A), feed shaft 4Y in the Y-axis direction (left/right direction in FIG. 3B), and feed shaft 4Z in the Z-axis direction (up/down direction in FIG. 3A).

Herein, the feed shaft 4X in the X-axis direction and the feed shaft 4Y in the Y-axis direction are provided above the bed 2 as shown in FIGS. 3A and 3B, and it is configured so as to be able to move a horizontal work table 5 to which a work (workpiece) W is loaded in horizontal directions (X-axis direction and Y-axis direction) by way of these feed shafts 4X, 4Y. In other words, the feed shaft 4X in the X-axis direction is configured from an X-axis ball screw 45X and X-axis motor 46X. Then, it is possible to move the work table 5 in the X-axis direction, by way of causing the X-axis ball screw 45X to rotate by driving the X-axis motor 46X. On the other hand, the feed shaft 4Y in the Y-axis direction is configured from a Y-axis ball screw 45Y and Y-axis motor 46Y. Then, it is possible to move the work table 5 in the Y-axis direction, by way of causing the Y-axis ball screw 45Y to rotate by driving the Y-axis motor 46Y.

In addition, the column 3 is installed in a standing manner on the upper side of the bed 2. To a front face part of the column 3, the feed shaft 4Z in the Z-axis direction is provided, whereby it is configured so as to enable moving the spindle head 6 in the vertical direction (Z-axis direction) by this feed shaft 4Z. In other words, the feed shaft 4Z in the Z-axis direction is configured from the Z-axis ball screw 45Z and Z-axis motor 46Z. Then, by causing the Z-axis ball screw 45Z to rotate by driving the Z-axis motor 46Z, it is possible to move the spindle head 6 in up/down direction (Z-axis direction).

Furthermore, the spindle unit 7 is provided to the spindle head 6. The spindle unit 7 is configured from the spindle 75 and spindle motor 76. Then, it is possible to cause the spindle 75 to rotate by driving the spindle motor 76. The spindle 75 is positioned above the work table 5, and can mount a tool 77 at the lower end of the spindle 75.

<Drilling Cycle of Work W>

Next, a sequence of performing a drilling cycle (drilling) of the work W using the machining center 150 will be explained. It should be noted that this drilling cycle is executed based on the commands from the numerical control device 100, excluding the mounting operation for the tool 77 and the placement operation of the work W by the operator.

First, the operator mounts the tool 77 to the spindle 75 of the machining center 150, and places and fixes the work W on the work table 5, as shown in FIGS. 3A and 3B.

Next, by appropriately causing the work table 5 to move in the horizontal direction (X-axis direction and Y-axis direction), the machining site of the work W is positioned directly under the tool 77. In this state, a drilling cycle is performed at the machining site of the work W, by causing the tool 77 to rotate by rotating the spindle 75, as well as appropriately causing the spindle head 6 to move in the up/down direction (Z-axis direction).

Accompanying the drilling cycle of the work W done in this way, heat generation occurs at the three types of feed shafts 4 (4X, 4Y, 4Z) and the spindle unit 7 in the machining center 150. Friction between the ball screws 45 (X-axis ball screw 45X, Y-axis ball screw 45Y, Z-axis ball screw 45Z) and the nuts 47, rotation of the spindle motor 76, friction of the bearings 78 of the spindle 75, etc. have mainly been considered as the causes of this heat generation. When such heat generation occurs, since the machine elements undergo thermal expansion, the ball screw 45 will elongate in the axial direction, and the spindle unit 7 leans. As a result thereof, the relative position between the machining site of the work W and the tool 77 shifts, and there is risk of the machining precision declining.

For this reason, upon the drilling cycle of the work W, a predetermined thermal displacement amount calculation equation (hereinafter referred to as "equation") for obtaining the thermal displacement amount by the three types of feed shafts 4 (4X, 4Y, 4Z) and the spindle unit 7 in order to compensate the machine position. This equation is disclosed in detail in Patent Document 1 and Patent Document 2. These equations calculate the thermal displacement amount according to integration by predetermined coefficients, or exponents or the like, with the operating state data such as the position, speed and temperature of the feed spindle 4, speed, load, temperature of the spindle unit 7, etc. during operation of the machining center 150 as the inputs.

In order to calculate the thermal displacement amount using the equation, the machining center 150 is configured so as to measure the operating state (e.g., position, speed and temperature of the feed shaft 4, speed, load, temperature of the spindle unit 7, etc. during operation (during machining or during idling) of each machine element (feed shaft 4 (4X, 4Y, 4Z) and spindle unit 7), by way of various sensors (not illustrated). By configuring in this way, it is possible to calculate the thermal displacement amount of each machine element by inputting this operating state data into the equation. It should be noted that a specific explanation of the equation will be described later. Furthermore, the machining center 150 is configured so as to measure the thermal displacement amount of each machine element by way of various displacement measuring instruments (not illustrated).

More specifically, the machining center 150 measures the operating state of various machine elements (i.e. position, speed and temperature of feed shaft 4, speed, load and temperature of spindle unit 7, etc. during operation (during machining or during idling) of the machining center 150) every predetermined sampling time by way of various sensors (not illustrated). Furthermore, the machining center 150 measures the thermal displacement amount (measured value) of each machine element every fixed time. It should be noted that the measurement site of this thermal displacement amount, for example, is preferably the vicinity of the machining position (leading end of tool 77) of the machining center 150. In addition, the measurement method of this thermal displacement amount is not particularly limited, and it is possible to adopt on-machine measurement by a touch probe, measurement of the machined work W, etc.

<Configuration of Numerical Control Device 100>

The numerical control device 100 serving as the control device is incorporated in the machining center 150. A CPU 11 of the numerical control device 100 is a processor that entirely controls the numerical control device 100, as shown in FIG. 4. The CPU 11 reads out a system program stored in ROM 12 via a bus 20, and controls the entirety of the numerical control device 100 following this system program. Temporal calculation data, display data and various kinds of data inputted by an operator via a display/MDI unit 70 are stored in RAM 13.

CMOS memory 14 is configured as non-volatile memory that is backed up by a battery (not illustrated) and in which the storage state is maintained even if the power source of the numerical control device 100 is turned off. In the CMOS memory 14, machining programs read via an interface 15, machining programs inputted via the display/MDI unit 70, etc. are stored. Various system programs for executing processing of editing mode necessitated for creation and editing of machining programs, and processing for automatic operation are written in advance in the ROM 12. The various machining programs such as a machining program can be inputted via the interface 15 and/or display/MDI unit 70, and stored in the CMOS memory 14.

The interface 15 enables connection with the numerical control device 100 and external equipment 72 such as an adapter. Machining programs, various parameters, etc. are read from the external equipment 72 side. In addition, the machining programs edited within the numerical control device 100 can be stored in an external storage means via the external equipment 72.

A PMC (programmable machine controller) 16 outputs signals via an I/O unit 17 to auxiliary devices (e.g., actuators such as robot hands for tool exchange) of the machining center 150 to control by a sequence program built into the numerical control device 100. In addition, after signals such as of various switches on a control panel equipped to the machining center 150 are received, and doing the necessary signal processing, they are transferred to the CPU 11.

The display/MDI unit 70 is a manual data input device equipped with a display, keyboard, etc., and the interface 18 receives commands and/or data from the keyboard of the display/MDI unit 70, and transfers to the CPU 11. The interface 19 is connected to the control panel 71 equipped with a manual pulse generator, etc. Axis control circuits 30 to 34 of each axis receive the movement command amount of each axis from the CPU 11, and output commands for each axis to the servo amplifiers 40 to 44.

The servo amplifiers 40 to 44 receive these commands and drive the servomotors 50 to 54 of each axis. The servomotors 50 to 54 of each axis are equipped with position/speed detectors, feedback position/speed feedback signals from these position/speed detectors to the axis control circuits 30 to 34, and perform feedback control of the position/speed. It should be noted that position/speed feedback is omitted in the block diagrams.

A spindle control circuit 60 receives a spindle rotation command for the machining center 150, and outputs a spindle speed signal to a spindle amplifier 61. The spindle amplifier 61 receives this spindle speed signal, and causes the spindle motor 76 of the machining center 150 to rotate at the commanded rotation speed to drive the tool.

A pulse encoder 63 is coupled by gears, a belt or the like to the spindle motor 76, whereby the pulse encoder 63 outputs a return pulse synchronized with the rotation of the spindle, and this return pulse passes through a bus 20 and is read by the CPU 11.

In addition, the numerical control device 100 acquires the operating state data representing the operating state of each machine element measured every predetermined sampling time by the machining center 150. Furthermore, the numerical control device 100 acquires the thermal displacement amount of each machine element measured every fixed time by the machining center 150.

<Configuration of Machine Learning Device 200>

The machine learning device 200 of the present embodiment is a device that learns coefficients for the equations disclosed in Patent Document 1 and Patent Document 2 based on training data.

FIG. 5 shows a functional block diagram of the machine learning device 200. The machine learning device 200 has a main control unit 201 as shown in FIG. 5. A data acquisition unit 202 serving as a data acquisition means, a thermal displacement amount acquisition unit 203 serving as a thermal displacement amount acquisition means, a storage unit 204 serving as a storage means, an equation setting unit 205 serving as an equation setting means, a thermal displacement amount calculation unit 206 serving as a thermal displacement amount calculation means, and a determination unit 207 serving as a determination means are connected to the main control unit 201.

The data acquisition unit 202 acquires operating state data of machine elements as input data from the numerical control device 100.

The thermal displacement amount acquisition unit 203 acquires the measured value for the thermal displacement amount of a machine element as input data from the numerical control device 100.

The storage unit 204 stores the operating state data of a machine element every sampling time acquired from the numerical control device 100 by the data acquisition unit 202 and the measured values for the thermal displacement amount of the machine element every fixed time acquired from the numerical control device 100 by the thermal displacement amount acquisition unit 203, as training data to be association with each other as a label.

The equation setting unit 205 sets the coefficients in the equation calculating the thermal displacement amount of a machine element based on the operating state data of the machine element, by performing machine learning which includes a well-known method such as the least-squares method, for example, based on the operating state data of the machine element and measured values for the thermal displacement amount of the machine element. Subsequently, the equation setting unit 205 further optimizes the equation by performing machine learning again on the coefficients included in this equation, based on the determination result of the determination unit 207 described later.

In other words, the equation setting unit 205, in the case of the determination result from the determination unit 207 described later being negative (i.e. case of difference between estimated value for the thermal displacement amount of a machine element within a predetermined time period calculated by an equation including coefficients set beforehand and measured value for thermal displacement amount of machine element exceeding a predetermined threshold), for example, a coefficient differing from the coefficients set thus far is set again by performing machine learning including a well-known method such as the least-squares method again. On the other hand, in the case of the determination result from the determination unit 207 described later being affirmative (i.e. case of difference between estimated value for thermal displacement amount of machine element within a predetermined time period calculated by an equation including coefficients set beforehand and measured value for thermal displacement amount of machine element being no more than a predetermined threshold), the equation setting unit 205 sets this coefficient as the optimal coefficient. By configuring in this way, the equation setting unit 205 can optimize the equation.

The thermal displacement amount calculation unit 206 calculates the estimated value for the thermal displacement amount of a machine element by substituting operating state data of the machine element stored as training data in the storage unit 204 into the equation set by the equation setting unit 205.

More specifically, the thermal displacement amount calculation unit 206 calculates the thermal displacement amount of a machine element by substituting operating state data of the machine element of every sampling time in a predetermined time period stored as training data in the storage unit 204, based on the equation. By repeatedly performing such calculation processing, and summing the thermal displacement amounts calculated every sampling time in the predetermined time period, the estimated value for the thermal displacement amount of the machine element in the predetermined time period by the machining center 150 is calculated.

The determination unit 207 determines whether or not the difference between the estimated value for the thermal displacement amount of the machine element calculated by the thermal displacement amount calculation unit 206 and the measured value for the thermal displacement amount of the machine element stored as training data in the storage unit 204 is no more than the predetermined threshold. Furthermore, the determination unit 207 notifies this determination result (affirmative/negative of coefficient) to the equation setting unit 205. By configuring in this way, the equation setting unit 205, in the case of the difference being determined as not being no more than the predetermined threshold by the determination unit 207, for example, resets a coefficient differing from coefficients set thus far, by performing machine learning including a well-known method such as the least-squares method again. In addition, in the case of the difference being determined as no more than the predetermined threshold by the determination unit 207, the equation setting unit 205 can set this equation as the optimal equation.

<Configuration of Thermal Displacement Compensation Device 300>

The thermal displacement compensation device 300 includes a compensation amount calculation unit 301 serving as a compensation amount calculation means, and a compensation execution unit 302 serving as a compensation execution means, as shown in FIG. 2. The compensation amount calculation unit 301 calculates the compensation amount corresponding to the thermal displacement amount of a machine element calculated from the operating state data of the machine element (determination data), based on the equation optimized by the machine learning device 200. The compensation execution unit 302 compensates the mechanical position of the machine element, based on the compensation amount for the machine element calculated by the compensation amount calculation unit 301. Alternatively, the compensation execution unit 302 sends the compensation amount for this machine element to the numerical control device 100.

<Processing Flow of Machine Learning Device 200>

Figure 6:
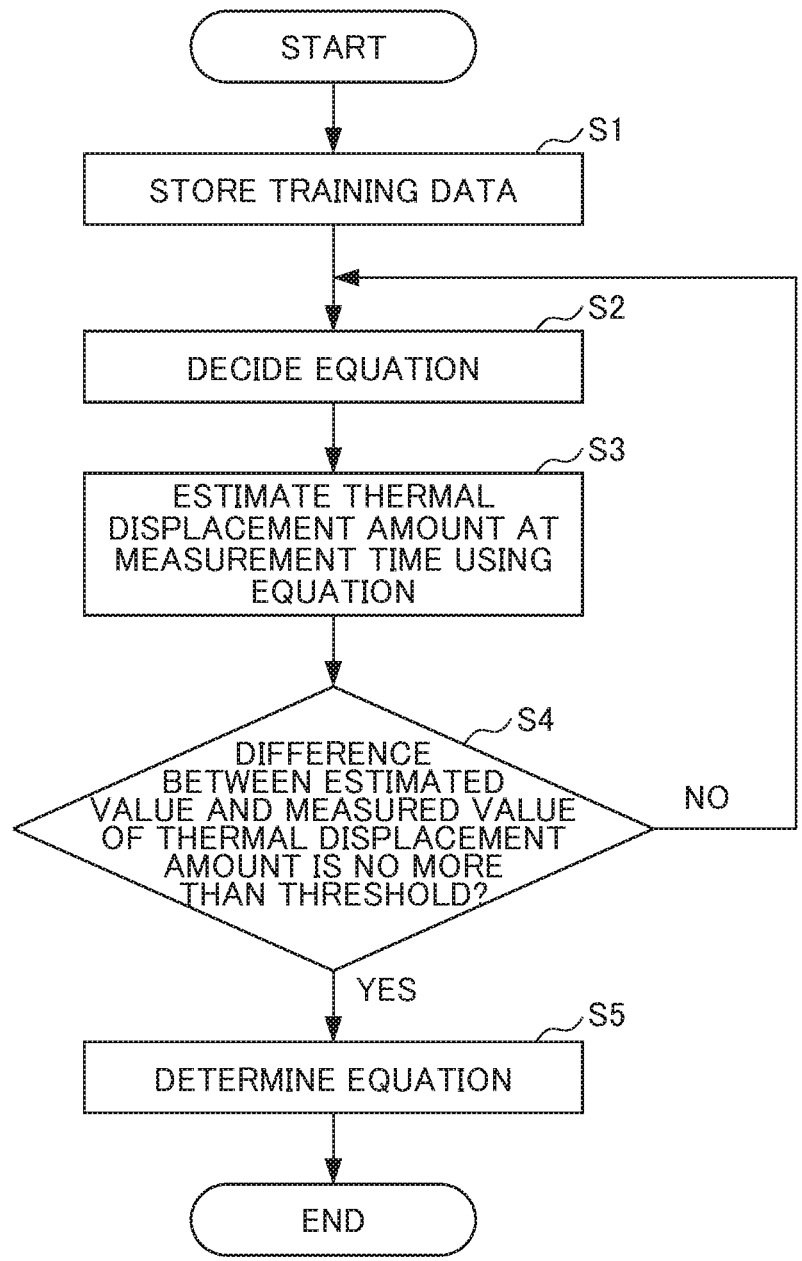
FIG. 6 is a flowchart showing processing of the machine learning device of the machining center according to the first embodiment of the present invention.

Next, the processing flow of the machine learning device 200 will be explained while referencing FIG. 6. FIG. 6 is a flowchart showing the processing of the machine learning device 200. Hereinafter, specifically how processing of the machine learning device 200 is executed will be explained for a case of performing thermal displacement compensation for the feed shaft 4 and spindle unit 7, which are machine elements of the machining center 150, will be explained.

In Step S1, the data acquisition unit 202 and thermal displacement amount acquisition unit 203 acquire the operating state data of the feed shaft 4 and spindle unit 7, and measured values for the thermal displacement amounts of the feed shaft 4 and spindle unit 7 from the numerical control device 100 as training data to use in machine learning. Subsequently, the storage unit 204 stores this operating state data of the feed shaft 4 and spindle unit 7 and measured values for the thermal displacement amounts of the feed shaft 4 and spindle unit 7 as training data to be associated with each other as a label.

In Step S2, the equation setting unit 205 sets the coefficients in the equation for calculating the thermal displacement amount of a machine element, by performing machine learning including a well-known method such as the least-squares method, for example, based on the operating state data for machine elements (feed shaft 4 and spindle unit 7) in a predetermined time period A and measured values (training data) for the thermal displacement amount of the machine element. It should be noted that the equation will be described later.

In Step S3, the thermal displacement amount calculation unit 206 calculates the estimated values for the thermal displacement amounts of the feed shaft 4 and spindle unit 7, by substituting the operating data for the feed shaft 4 and spindle unit 7 in a predetermined time period B stored as training data in the storage unit 204 into the equation set by the equation setting unit 205. Herein, a summary for the equation and calculation method in order for the thermal displacement amount calculation unit 206 to calculate the estimated values for the thermal displacement amounts of the feed shaft 4 and spindle unit 7 in the predetermined time period B. It should be noted that the equation and calculation method are based on those described in Patent Document 1 and Patent Document 2.

Upon calculating the estimated values for the thermal displacement amounts of the feed shaft 4 and spindle unit 7, they are considered for every respective axial direction (X-axis direction, Y-axis direction, Z-axis direction), as described below. The thermal displacement amount in the X-axis direction is the elongation of the X-axis ball screw 45X of the feed shaft 4X in the X-axis direction. In addition, the thermal displacement amount in the Y-axis direction is an amount arrived at by adding the thermal displacement amount in the Y-axis direction of the spindle unit 7 to the elongation of the Y-axis ball screw 45Y of the feed shaft 4Y in the Y-axis direction. Furthermore, the thermal displacement amount in the Z-axis direction is an amount arrived at by adding the thermal displacement amount in the Z-axis direction of the spindle unit 7 to the elongation of the Z-axis ball screw 45Z of the feed shaft 4Z in the Z-axis direction. Herein, in regards to the thermal displacement amount in the X-axis direction, the reason for not adding the thermal displacement amount in the X-axis direction of the spindle unit 7 is that, since the structure of the spindle unit 7 is left/right symmetrical along the X-axis direction as shown in FIG. 3A, it is considered that the spindle unit 7 does not thermally displace in the X-axis direction.

Figure 7:
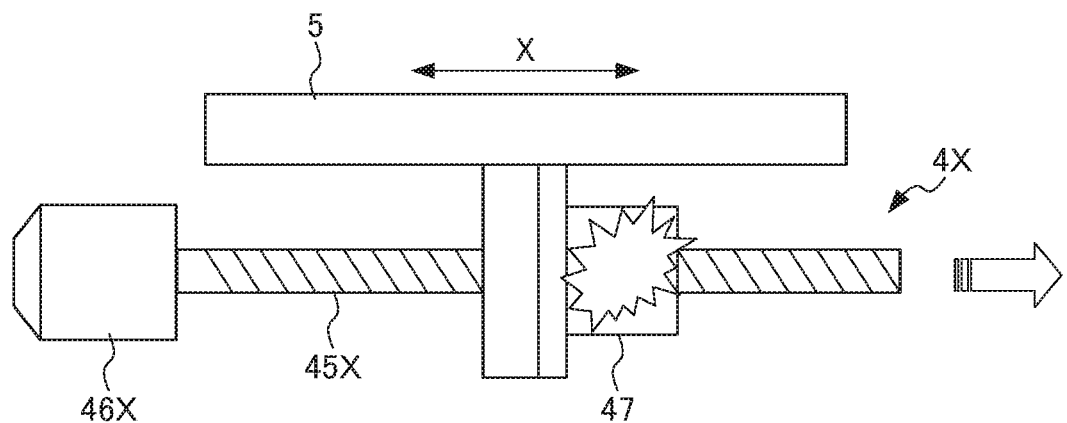
FIG. 7 is a view for explaining the workings whereby a feed shaft of the machining center according to the first embodiment of the present invention is thermally displaced.

Thermal displacement amount in $X$-axis direction=elongation of $X$-axis ball screw Thermal displacement amount in Y-axis direction=elongation of Y-axis ball screw+thermal displacement amount in Y-axis direction of spindle unit Thermal displacement amount in Z-axis direction=elongation of Z-axis ball screw+thermal displacement amount in Z-axis direction of spindle unit In addition, for the elongation of the X-axis ball screw 45X, only the portion from the base connected to the X-axis motor 46X until the threaded part threading with the nut 47 is considered the target, as shown in FIG. 7. This is because, since the previous elongation from the threaded part does not affect movement in the X-axis direction of the work table 5, i.e. alignment of the work W on the work table 5, it can be ignored. This matter similarly applies for the elongation of the Y-axis ball screw 45Y and Z-axis ball screw 45Z.

Figure 8:
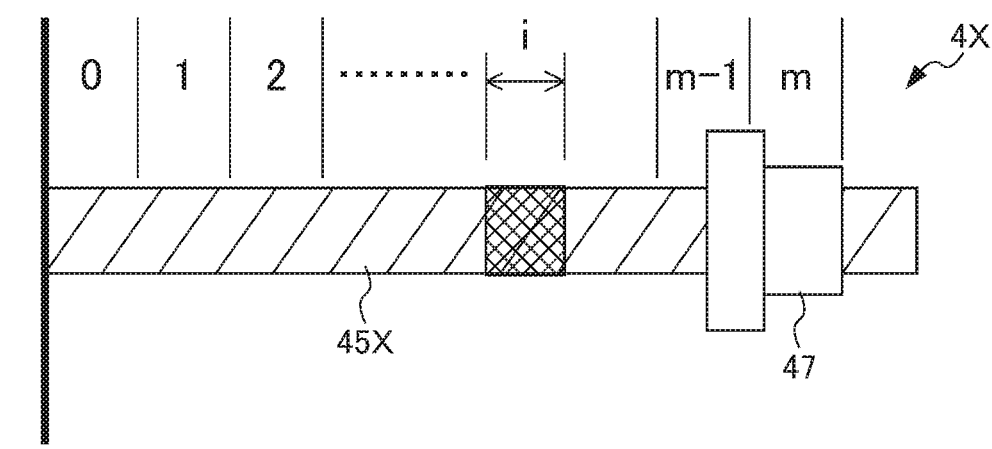
FIG. 8 is a schematic view showing a method of estimating the thermal displacement of a feed shaft of the machining center according to the first embodiment of the present invention.

Next, with the example of thermal displacement amount of the feed shaft 4X in the X-axis direction, the equation and calculation method by which the thermal displacement amount calculation unit 206 calculates the thermal displacement amount of the feed shaft 4X in the X-axis direction will be explained. In order to calculate the thermal displacement amount of the feed shaft 4X in the X-axis direction, the X-axis ball screw 45X is captured as a one-dimensional model, and the X-axis ball screw 45X is divided into a plurality (m-number in FIG. 8) of segments by a predetermined length (e.g., 10 mm) along the axial direction thereof, as shown in FIG. 8. Then, the thermal displacement amount calculation unit 206, while considering the heat generation and radiation of the X-axial ball screw 45X in every respective segment, and further, the influence (heat conduction) from adjacent segments on both sides, calculates the thermal displacement amount thereof. Subsequently, the thermal displacement amount calculation unit 206 calculates an estimated value for the thermal displacement of the X-axis ball screw 45X overall, i.e. thermal displacement amount of the feed shaft 4X in the X-axis direction, from the sum of the thermal displacement amounts for every segment thereof.

Herein, the thermal displacement amount of a segment i ($0 \leq i \leq m$) at a time n ($0 \leq n$), for example, can be calculated using the following Equation (1). It should be noted that this formula is merely one example, and it is also possible to calculate the thermal displacement amount using another formula. Herein, A, B, C, a and b are coefficients serving as optimization targets.

$$\delta_{ni} = \delta_{(n-1)i} + A \times V_{ni}^{a} - B \times \delta_{(n-1)i}^{b} + C \times \{\delta_{(n-1)i-1} + \delta_{(n-1)i+1} - 2 \times \delta_{(n-1)i}\} \quad (1)$$

$\delta_{ni}$: thermal displacement amount of segment i at time n
$V_{ni}$: average velocity of segment i at time n An estimated value $L_{nm}$ for the thermal displacement amount in the X-axis direction at time n is represented by the following Formula (2), by adding the thermal displacement amount for every respective segment i represented by Equation (1) described above from segment 0 to segment m.

$$L_{nm} = \delta_{n0} + \delta_{n1} + \ldots + \delta_{ni} + \ldots + \delta_{nm} \quad (2)$$

In this way, the thermal displacement amount calculation unit 206 calculates the thermal displacement amount of the feed shaft 4X in the X-axis direction for a predetermined time period B, based on Formula 1 and Formula 2.

It should be noted that, for the feed shaft 4Y in the Y-axis direction and feed shaft 4Z in the Z-axis direction, the arrangement state thereof (orientation of ball screw 45) only differs from the feed shaft 4X in the X-axis direction, and the calculation method explained herein can similarly be applied.

In addition, upon calculating the estimated value for the thermal displacement amount of the spindle unit 7, for example, it is possible to use the well-known equations and calculation method disclosed in Patent Document 2, for example. Herein, explanations will be omitted.

In Step S4, the determination unit 207 compares the estimated values for the thermal displacement amounts of the feed shaft 4 and spindle unit 7 at a predetermined time period calculated by the thermal displacement amount calculation unit 206 with the measured values for the thermal displacement amounts of the feed shaft 4 and spindle unit 7 at the predetermined time period acquired by the thermal displacement amount acquisition unit 203, calculates the difference between the two, and determines whether this difference is no more than a predetermined threshold. In the case of this determination being NO (i.e. case of this difference exceeding a predetermined threshold), since it is considered that the probability of this equation being statistically suitable is low, the processing returns to Step S2. On other hand, in the case of this determination being YES (i.e. case of this difference being no more than predetermined threshold), since it is considered that the probability of this equation being statistically suitable is high, the processing advances to Step S5.

In Step S5, the equation setting unit 205 sets coefficients A, B, C, a and b in the above-mentioned Equation (1) as the optimal coefficients. It is thereby possible to optimize Equation (1). Herein, the operation of obtaining the equation for the operating state data of the machine element and thermal displacement amount of the machine element ends.

It should be noted that the predetermined time period A in Step S2 and predetermined time period B in Step S3 will be briefly explained. The predetermined time period A and predetermined time period B may be partially overlapping, or may be established so as not to overlap. However, for a predetermined time period A' upon transitioning to Step S2 in the case of the determination in Step S4 being NO, it is desirable to configure so as to include the predetermined time period B upon executing the immediately prior Step S3. In addition, upon the equation being set again in Step S2, and then moving to Step S3, it is desirable to configure so that a predetermined time period B' in Step S3 includes the previous predetermined time period B or overlaps. By configuring in this way, it becomes possible to reconfirm that the difference for the predetermined time period B for which the equation set again in Step S2 was made NO in the previous determination became no more than the threshold.

Modified Example

It may be configured so that, in the case of the determination in Step S4 being YES, it is determined whether all of the training data stored in the storage unit 204 was learned rather than immediately advance to Step S5, and in the case of this determination being NO (i.e. case of not learning all of the training data), the processing returns to Step S2, repeats the calculation operation of the equation (i.e. coefficients) by machine learning, and in the case of this determination being YES (i.e. case of learning all of the training data, advances to Step S5 for the first time.

<Processing Flow of Thermal Displacement Compensation Device 300>

The thermal displacement compensation device 300 compensates for thermal displacement of a machine element in real time based on the most recent equation. For this, first, the compensation amount calculation unit 301 calculates the compensation amount corresponding to the thermal displacement amount of the machine element calculated from the operating state data of the machine element, based on the equation optimized by the machine learning device 200. Next, the compensation execution unit 302 compensates the mechanical position of the machine element based on the compensation amount of the machine element calculated by the compensation amount calculation unit 301. Alternatively, the compensation execution unit 302 sends the compensation amount of this machine element to the numerical control device 100.

Receiving this, the numerical control device 100 compensates for the thermal displacement of the machine element based on the compensation amount of this machine element. Therefore, the machining center 150 executes a drilling cycle of the work W, while compensating for thermal displacement of the machine element in real time. As a result thereof, it is possible to reduce the shift in relative position between the machining site of work W and the tool 77 caused by thermal displacement of the machine elements upon the drilling cycle of the work W, and thus machine the work W with high precision.

Effects of Present Embodiment

In the above way, according to the present embodiment, it is possible to optimize the equation estimating the thermal displacement amount of a machine element by repeating machine learning (supervised learning), using the training data in which operating state data of the machine element (feed shaft 4, spindle unit 7) and measured values for the thermal displacement amount of the machine element are associated for the machining center 150. As a result thereof, it becomes possible to compensate for thermal displacement with good precision in various types of machining.

In addition, the equation for the operating state data of the machine element and thermal displacement amount of the machine element is stored in the numerical control device 100; therefore, by transmitting this equation via a network 400, it is also possible to use in any other machining center 150 with the equation obtained by any one machining center 150 as a shared resource.

In addition, so long as using a formula made taking account for the above-mentioned time n upon estimating the thermal displacement amount of the machine element, it is possible to accurately estimate the thermal displacement amount of the machine element, even in a case such that the operating state of the machine element complexly changes accompanying the elapse of time.

Other Embodiments

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

Modified Example 1

In the first embodiment, mainly a configuration is explained in which the numerical control device 100, machine learning device 200 and thermal displacement compensation device 300 are respectively connected to the network 400. In contrast, the numerical control device 100 and thermal displacement compensation device 300 may be directly connected via a connecting part. In addition, it may be configured so that the numerical control device 100 includes the thermal displacement compensation device 300.

Modified Example 2

The machine learning device 300 of the first embodiment may be made a computer system including a CPU. In this case, the CPU reads out a program stored in a storage unit such as ROM, and causes the computer to function as the main control unit 201, data acquisition unit 202, thermal displacement amount acquisition unit 203, storage unit 204, equation setting unit 205, thermal displacement amount calculation unit 206 and determination unit 207, by following this program.

Modified Example 3

The first embodiment explains a case of applying the present invention to the machining center 150; however, so long as being a device having a machine element that thermally expands, it is possible to similarly apply the present invention also to machine tools other than the machining center 150.

EXPLANATION OF REFERENCE NUMERALS

2 bed (machine element)
3 column (machine element)
4 feed shaft (machine element)
5 work table (machine element)
6 spindle head (machine element)
7 spindle unit (mechanical unit)
100 numerical control device (control device)
150 machining center (machine tool)
200 machine learning device
202 data acquisition unit (data acquisition means)
203 thermal displacement amount acquisition unit (thermal displacement amount acquisition means)
204 storage unit (storage means)
205 equation setting unit (equation setting means)
206 thermal displacement amount calculation unit (thermal displacement amount calculation means)
207 determination unit (determination means)
300 thermal displacement compensation device
301 compensation amount calculation unit (compensation amount calculation means)
302 compensation execution unit (compensation execution means)

What is claimed is:

1. A machine learning device that optimizes a coefficient of an equation established in advance for estimating a thermal displacement amount of a machine element that thermally expands by way of machine learning, based on operating state data representing an operating state of the machine element of a machine tool having the machine element, wherein the equation is not an equation based on weighting by a neural network, but is an equation which defines time and operating state data of the machine element as variables, and includes integration by a predetermined coefficient or an exponent, the machine learning device comprising:
 a computer including processor and a non-transitory memory having stored thereon executable instructions, which when executed, causes the computer to function as:

a data acquisition unit for acquiring the operating state data of the machine element;

a thermal displacement amount acquisition unit for acquiring measured values for a thermal displacement amount of the machine element;

a storage unit for storing the operating state data of the machine element acquired by the data acquisition unit and the measured values for the thermal displacement amount of the machine element acquired by the thermal displacement amount acquisition unit as training data associated with each other as a label;

an equation setting unit for setting a coefficient of the equation for calculating the thermal displacement amount of the machine element, by performing machine learning of the coefficient related to the equation without using a neural network, based on the operating state data of the machine element and the measured values for the thermal displacement amount of the machine element;

a thermal displacement amount calculation unit for calculating an estimated value for the thermal displacement amount of the machine element, by substituting operating state data of the machine element within a predetermined time period stored as training data in the storage unit, into the equation set by the equation setting unit; and a determination unit for determining whether a difference between the estimated value for the thermal displacement amount of the machine element within the predetermined time period calculated by the thermal displacement amount calculation unit and the measured value for the thermal displacement amount of the machine element within the predetermined time period stored as training data in the storage unit is no more than a predetermined threshold, wherein the equation setting unit sets again the coefficient of the equation in a case of being determined that the difference is not no more than a predetermined threshold by way of the determination unit, and sets said coefficient of the equation as an optimal equation in a case of being determined that the difference is no more than a predetermined threshold by way of the determination unit.

2. The machine learning device according to claim 1,
wherein the machine element includes a feed shaft and spindle unit of the machine tool, and
wherein the operating state of the machine element includes at least one of a position, speed and temperature of the feed shaft, and at least one of a speed, load and temperature of the spindle unit, during operation of the machine tool.

3. The machine learning device according to claim 1, wherein the equation includes: an equation which divides each shaft of the feed shaft and the spindle unit of the machine tool into a plurality of segments, defines time and operating state data of the machine element as variables for calculating a thermal displacement amount of every segment, and has integration by a predetermined coefficient or an exponent; and an equation for calculating a thermal displacement amount of each of the shafts according to a sum of the thermal displacement amount for every segment.

4. The machine learning device according to claim 1, wherein the data acquisition unit acquires operating state data every predetermined sampling time of the machine element from a control device that controls the machine tool.

5. The machine learning device according to claim 1, wherein the thermal displacement amount acquisition unit acquires a measured value for the thermal displacement amount of the machine element measured every predetermined time interval in a vicinity of a machining position of the machine tool.

6. A thermal displacement compensation device for a machine tool, wherein the thermal displacement compensation device (i) calculates a compensation amount corresponding to the thermal displacement amount of the machine element calculated from the operating state data of the machine element, based on an equation optimized by way of the machine learning device according to claim 1, and (ii) compensates the machine position of the machine element, based on the calculated compensation amount of the machine element.

7. The thermal displacement compensation device according to claim 6, wherein the thermal displacement compensation device is included in a control device of the machine tool.

* * * * *